(12) United States Patent
Kida et al.

(10) Patent No.: US 7,086,739 B2
(45) Date of Patent: Aug. 8, 2006

(54) PROJECTION DISPLAY APPARATUS WITH CAPABILITY OF CONTROLLING WHETHER TO COOL LAMP DEPENDING ON LAMP TEMPERATURE WHEN RESTARTING LAMP

(75) Inventors: Hiroshi Kida, Tokyo (JP); Naoto Kontani, Tokyo (JP); Tomohiro Bessho, Tokyo (JP); Mitsuhiro Kawaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/828,461

(22) Filed: Apr. 21, 2004

(65) Prior Publication Data
US 2004/0212787 A1 Oct. 28, 2004

(30) Foreign Application Priority Data
Apr. 28, 2003 (JP) ............................. 2003-123589
Dec. 3, 2003 (JP) ............................. 2003-404055

(51) Int. Cl.
*G03B 21/16* (2006.01)
*G03B 21/20* (2006.01)
*H04N 5/74* (2006.01)

(52) U.S. Cl. ........................... 353/52; 353/85; 348/748

(58) Field of Classification Search .................. 353/30, 353/31, 34, 52, 57, 58, 60, 61, 85; 348/748; 362/226, 254, 285, 287
See application file for complete search history.

(56) References Cited

U.S. PATENT DOCUMENTS

| 6,419,364 | B1* | 7/2002 | Takizawa et al. | 353/52 |
| 6,467,911 | B1* | 10/2002 | Ueyama et al. | 353/87 |
| 6,776,489 | B1* | 8/2004 | Suzuki | 353/20 |
| 6,860,608 | B1* | 3/2005 | Kimura | 353/85 |
| 2002/0163626 | A1 | 11/2002 | Takizawa et al. | 353/52 |

FOREIGN PATENT DOCUMENTS

| EP | 0 425 989 A2 | 5/1991 |
| JP | 4-53943 A | 2/1992 |
| JP | 2903655 B2 | 3/1999 |

* cited by examiner

*Primary Examiner*—Melissa Jan Koval
(74) *Attorney, Agent, or Firm*—Birch, Stewart, Kolasch & Birch, LLP

(57) ABSTRACT

A time management section is configured to change an output voltage in accordance with a temperature change characteristic of a lamp allowed to cool down. For restart of the lamp after the turn-off of the lamp, the lamp is cooled by a fan before the operation of turning on the lamp when it is judged that the temperature of the lamp is higher than a predetermined value, based on the output voltage from the time management section. The lamp is immediately turned on without the cooling of the lamp by the fan when it is judged that the temperature of the lamp is lower than the predetermined value.

15 Claims, 15 Drawing Sheets

FIG. 14

| ELAPSED TIME SINCE TURN-OFF | FAN DRIVE TIME |
|---|---|
| 0 SEC. | 60 SEC. |
| 30 SEC. | 50 SEC. |
| 60 SEC. | 40 SEC. |
| 90 SEC. | 30 SEC. |
| 120 SEC. | 20 SEC. |
| 150 SEC. | 10 SEC. |
| 180 SEC. OR LONGER | 0 SEC. |

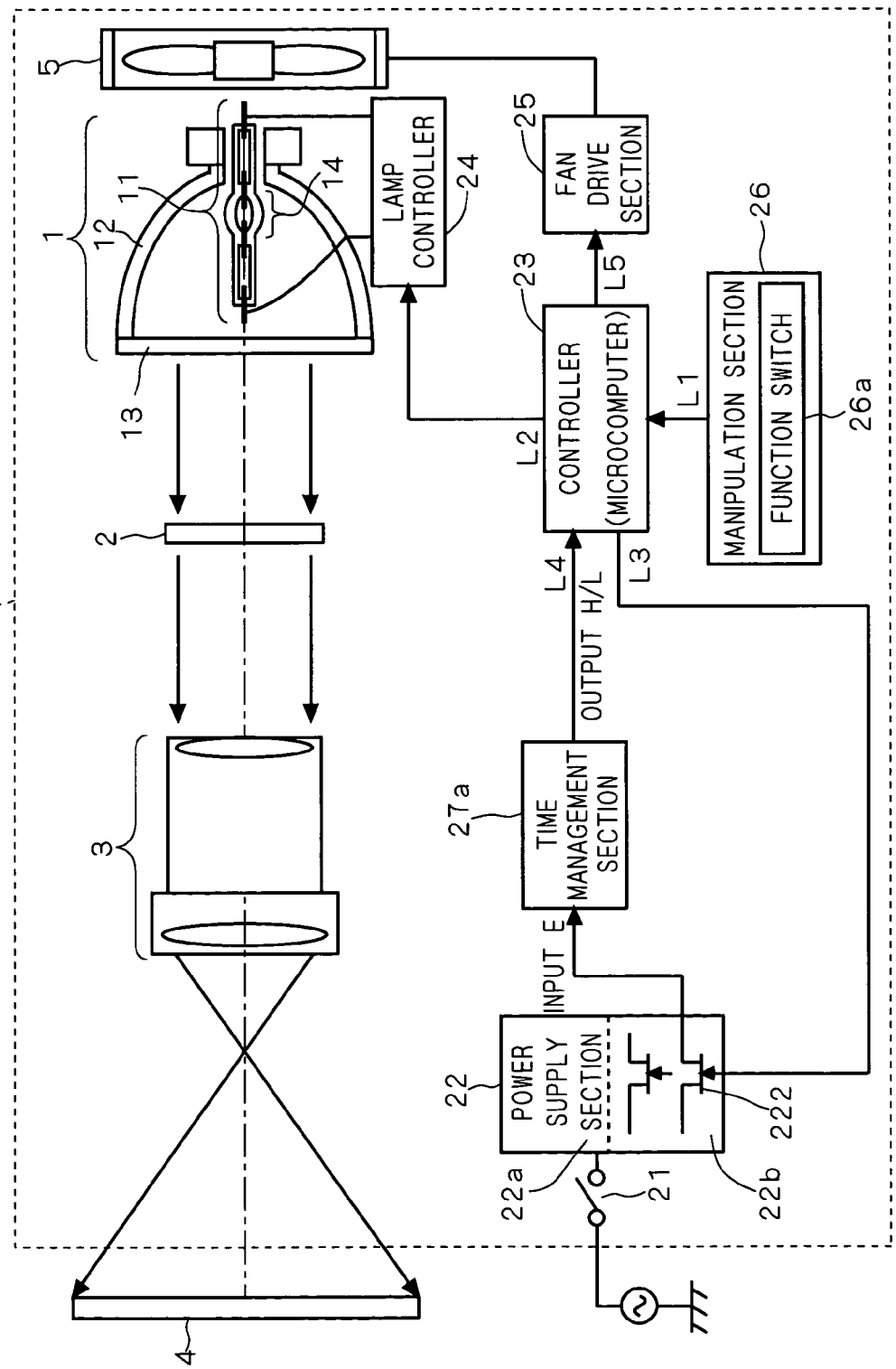

F I G . 1 6
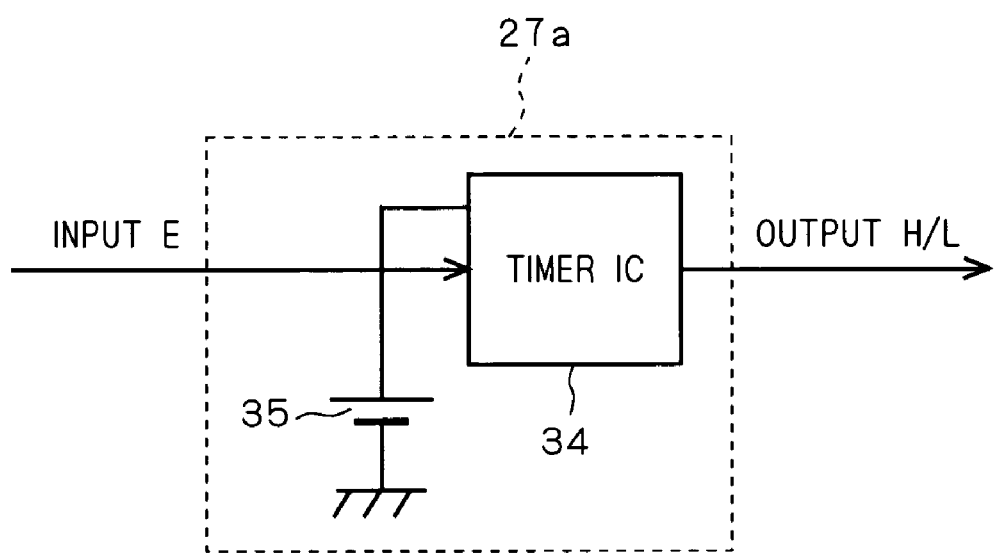

PROJECTION DISPLAY APPARATUS WITH CAPABILITY OF CONTROLLING WHETHER TO COOL LAMP DEPENDING ON LAMP TEMPERATURE WHEN RESTARTING LAMP

BACKGROUND OF THE INVENTION

1. Field of the Invention

The present invention relates to a projection display apparatus and, more particularly, to a technique for controlling the cooling of a lamp.

2. Description of the Background Art

In recent years, discharge lamps (xenon lamps, metal halide lamps, high-pressure mercury lamps and the like) have been mainly used as lamps for use in projection display apparatuses. This type of discharge lamp has the drawback of being unable to restart after being turned off if the temperature of the lamp is high.

To remedy this, a conventional projection display apparatus must be turned off after a lamp which has a high temperature during operation is cooled by driving a cooling fan for a certain period of time in order to smoothly perform a lamp-on operation when power supply to the lamp is turned off and then turned on. To shorten the cooling time in this case, for example, a projection display apparatus as disclosed, for example, in Japanese Patent Application Laid-Open No. 4-53943 (1992) is constructed to cool a lamp, after power supply to the lamp is turned off, with a power higher than the cooling power used in the lamp-on state.

It is, however, difficult to ensure the lamp cooling time after the use of the projection display apparatus under all conditions. In some cases, the cooling time required immediately after the projection display apparatus is turned off is not ensured, for example, if the projection display apparatus is turned off by an accident such as power failure or the removal of a power cord or if the projection display apparatus must be stow away quickly.

Even in the above-mentioned cases, the lamp turns on smoothly if a sufficient time interval between the turn-off of the lamp and the subsequent turn-on of the lamp of the projection display apparatus allows the lamp to cool down to a restartable temperature at which the lamp can turn on again. However, the lamp fails to turn on again if the temperature of the lamp remains still high because of the short time interval between the turn-off of the lamp and the restart thereof.

An attempt to forcibly apply high-pressure pulses to the lamp to activate the lamp although the lamp is under conditions of being unable to restart might cause failures such as a circuit malfunction due to pulse noise to result in a breakage of the lamp.

SUMMARY OF THE INVENTION

It is an object of the present invention to provide a projection display apparatus capable of managing cooling time after a lamp is powered off to judge whether to cool the lamp in accordance with the temperature of the lamp when restarting the lamp, thereby restarting the lamp without degradation of the lamp.

According to the present invention, a projection display apparatus configured to modulate light radiated from a lamp to project the modulated light includes a cooling element, a time management section, and a controller. The cooling element cools the lamp. The time management section manages time elapsed since turn-off of power supply to the lamp. The controller controls restart of the lamp after turn-off of the lamp. The controller turns on the lamp after causing the cooling element to cool the lamp when the temperature of the lamp is higher than a predetermined temperature, based on an output from the time management section. The controller turns on the lamp without causing the cooling element to cool the lamp prior to turn-on of the lamp when the temperature of the lamp is lower than the predetermined temperature, based on the output from the time management section.

The projection display apparatus can satisfactorily accomplish the restart of the lamp under all conditions without lamp degradation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows an example of a conversion table;

FIG. 15 schematically shows the construction of the projection display apparatus according to a fifth preferred embodiment of the present invention; and FIG. 16 shows an example of the construction of the time management section according to the fifth preferred embodiment.

DESCRIPTION OF THE PREFERRED EMBODIMENTS

First Preferred Embodiment

Figure 1:
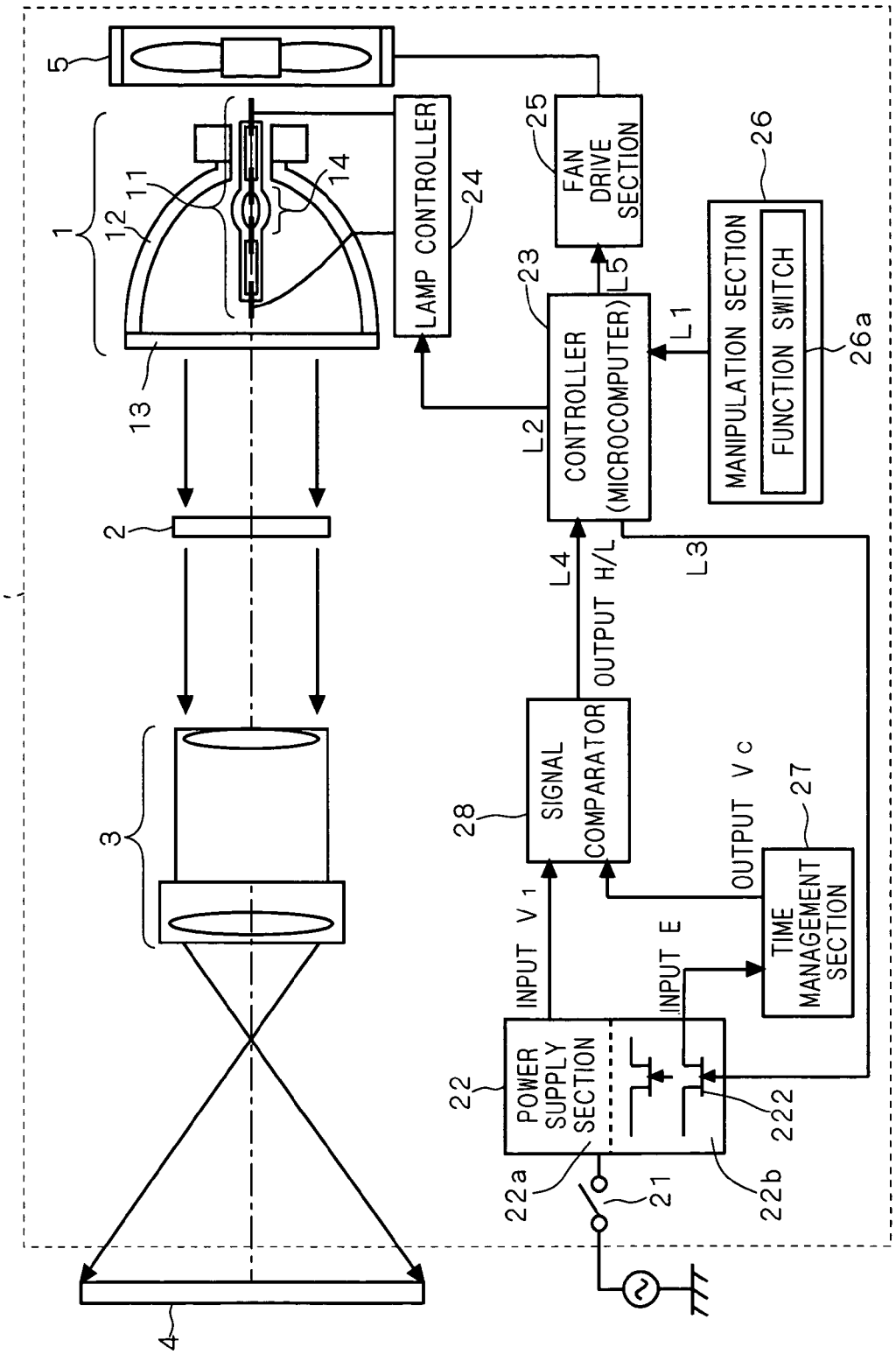
FIG. 1 schematically shows the construction of a projection display apparatus according to a first preferred embodiment of the present invention.

FIG. 1 schematically shows the construction of a projection display apparatus 10 according to a first preferred embodiment of the present invention. An optical system in the projection display apparatus 10 includes a light source 1, a light valve 2, and a projection lens 3. Light emitted from the light source 1 is modulated by the light valve 2 in accordance with an image to be projected to form image light, and the image light is projected through the projection lens 3.

The light source 1 includes a lamp 11 for radiating light, a reflecting mirror 12 for collecting the light radiated from the lamp 11, and a front glass 13 for covering a light exit opening side of the reflecting mirror 12. An example of the lamp 11 used herein includes a discharge lamp such as a xenon lamp, a metal halide lamp, and a high-pressure mercury lamp in consideration for a high degree of light emitting efficiency, the provision of a light emitting element close to a point light source having a high degree of light utilization efficiency through the optical system, high color rendering property, and long life. Among these lamps, the high-pressure mercury lamp is more preferably used. The reflecting mirror 12 has an inner surface (reflecting surface) opposed to the lamp 11 and having a paraboloidal or ellipsoidal shape for reflection. In particular, the reflecting surface is coated with a film of metal such as aluminum and silver, and a dielectric multi-layer film to provide a satisfactory reflecting characteristic. The front glass 13 is provided to prevent broken pieces of the lamp 11 from scattering within the apparatus because an increased pressure in an arc tube 14 during the operation of the lamp 11 might rupture the lamp 11 having a defect in the worst case.

The light valve 2 includes a transmissive or reflective liquid crystal element, and a light modulator such as a DMD (digital micromirror device) which controls light by means of the inclination of mirrors. The light valve 2 is constructed to modulate the incident light from the light source 1 in accordance with an image signal inputted to the light modulator. The light modulated by the light modulator is magnified by the projection lens 3 and then projected onto a screen 4 located forward of an optical axis. Thus, an image in accordance with the image signal is projected on the screen 4.

A fan 5 for cooling the light source 1 is provided near the light source 1, and is constructed to cool the light source 1 before the lamp 11 turns on, while the lamp 11 is on or after the lamp 11 turns on. Although the fan 5 is shown as cooling the entire light source 1, the fan 5 may be constructed to deliver air through a hole formed in part of the reflecting mirror 12 into the light source 1 to cool the lamp 11 or the arc tube 14 which acquires the highest temperature.

As a control system for controlling the above-mentioned optical system and the fan 5, the projection display apparatus 10 includes a main switch 21, a power supply section 22, a controller 23, a lamp controller 24, a fan drive section 25, a manipulation section 26, a time management section 27, and a signal comparator 28.

The main switch 21 is a switch for turning on/off external power supply to the projection display apparatus 10, and has a switch contact which is opened and closed by user's on-off operation. When the main switch 21 is on, the external power is supplied to the power supply section 22.

The power supply section 22 includes a smoothing circuit for converting the externally supplied AC power into DC power, and a voltage conversion circuit for converting the DC power into a voltage required to operate various circuits including the controller 23, the lamp controller 24, the fan drive section 25 and the like. As shown in FIG. 1, the power supply section 22 includes a first power supply circuit 22a and a second power supply circuit 22b. The first power supply circuit 22a is constructed to supply power to the controller 23 simultaneously with the turn-on of the main switch 21, and to output a predetermined voltage $V_1$ to the signal comparator 28. The second power supply circuit 22b includes switching elements connected to the various circuits, respectively, to supply power to the various circuits. The second power supply circuit 22b is constructed so that the turn-on of the main switch 21 and the receipt of a signal from the controller 23 cause the switching elements to turn on individually to supply required power to the respective circuits. For example, the second power supply circuit 22b includes a switching element 222 connected to the time management section 27. The switching element 222 outputs a predetermined voltage E to the time management section 27 when a signal from the controller 23 turns on the switching element 222.

The controller 23 includes a microcomputer, and not only operates the various circuits provided in the projection display apparatus 10 but also has the functions of effecting the time control of the various circuits and managing the operating states thereof.

The controller 23 monitors the manipulation status of a function switch 26a and the like of the manipulation section 26 through a terminal L1. The controller 23 transmits a drive signal through a terminal L2 to the lamp controller 24, and transmits a drive signal through a terminal L5 to the fan drive section 25. The controller 23 also transmits at a terminal L3 to the second power supply circuit 22b a predetermined signal for on-off control of the voltage E to be applied to the time management section 27, and receives a "high" signal or a "low" signal from the signal comparator 28 through a terminal L4. Although not shown, when image projection onto the screen 4 starts in the projection display apparatus 10, the controller 23 transmits the image signal to the light modulator included in the light valve 2 to effect the display control of images projected on the screen 4.

The manipulation section 26 includes a group of various switches for manipulation of image adjustment, function settings and the like, in addition to the function switch 26a for switching on and off the lamp 11 in the projection display apparatus 10, independently of the main switch 21. As an example, turning on the main switch 21 places the microcomputer of the controller 23 in the operating state. At this time, however, the projection display apparatus 10 does not start the operation of projecting images, but enters a standby state temporarily. Then, in response to the switching on of the function switch 26a of the manipulation section 26, the controller 23 effects power supply control to start supplying power to the circuits and to send actuating signals to the respective circuits. This causes the projection display apparatus 10 to start effectively performing its image projection function, e.g. turning on the lamp 11 through the lamp controller 24, and driving the fan 5 through the fan drive section 25 to cool the lamp 11.

When the function switch 26a turns off while the projection display apparatus 10 performs the operation of projecting images, the image projection function stops, and the lamp 11 turns off. After the lamp 11 turns off, the controller 23 drives the fan 5 for a certain period of time to cool the lamp 11. On the other hand, when the function switch 26a is not turned off but the main switch 21 is turned off while the projection display apparatus 10 performs the operation of projecting images, all of the circuits including the controller 23 and the fan 5 in the projection display apparatus 10 are rendered inoperative. In this case, the cooling by the fan 5 is not performed after the turn-off of the lamp 11.

The time management section 27 includes a timer circuit for measuring an elapsed time since the turn-off of the lamp 11 caused by the stop of power supply to the lamp 11. The timer circuit is constructed so that a timer function thereof effectively operates if the main switch 21 is turned off to stop the external power supply to the projection display apparatus 10.

Figure 2:
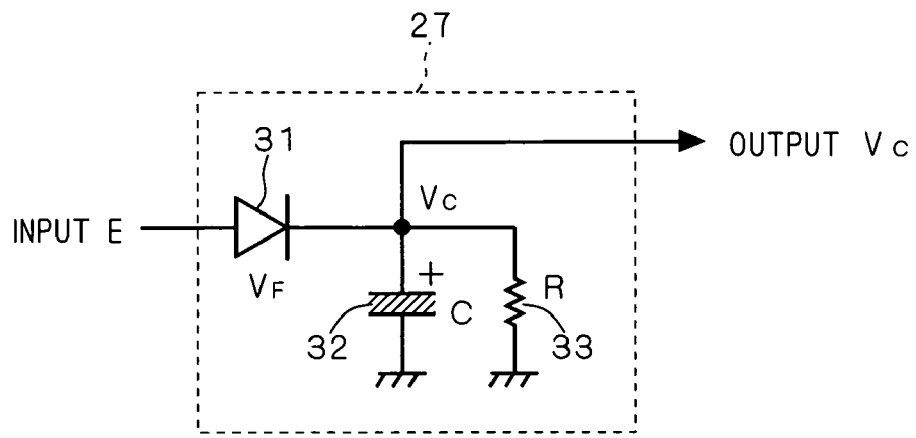
FIG. 2 shows an example of the construction of a time management section.

FIG. 2 shows an example of the circuit configuration of the time management section 27. The time management section 27 includes a diode 31, a capacitor 32, and a resistor 33. The time management section 27 has an input terminal connected to the second power supply circuit 22b, and an output terminal connected to the signal comparator 28.

The output terminal L3 of the controller 23 connected to the second power supply circuit 22b is operatively associated with the output terminal L2 of the controller 23 connected to the lamp controller 24. When the lamp 11 turns on, the switching element 222 in the second power supply circuit 22b connected to the time management section 27 turns on to apply the voltage E to the time management section 27. Thus, electrical charge is stored through the diode 31 into the capacitor 32 in the time management section 27 in synchronism with the turn-on of the lamp 11.

A voltage $V_O$ resulting from the charging of the capacitor 32 is given by $$V_O = E - V_F \quad (1)$$

where E is the voltage applied from the second power supply circuit 22b to the time management section 27, and $V_F$ is a forward voltage of the diode 31.

When the lamp 11 is turned off by the turn-off of the function switch 26a or by the turn-off of the main switch 21, voltage supply to the time management section 27 is cut off (i.e., E=0) in operative association therewith, whereby the electrical charge accumulated in the capacitor 32 is gradually discharged through the resistor 33. Voltage corresponding to the temperature of the arc tube 14 is outputted from the output terminal of the time management section 27 by selecting a capacitance and a resistance so that discharge time during which the capacitor 32 is discharged is equal in length to natural cooling time (heat dissipation time) during which the arc tube 14 is left to cool down after the turn-off of the lamp 11.

The diode 31 is provided to prevent backflow of the electrical charge to the second power supply circuit 22b while the electrical charge is discharged from the capacitor 32 through the resistor 33. Therefore, if the second power supply circuit 22b is higher in impedance than the resistor 33, the diode 31 may be dispensed with. In this case, Equation (1) is expressed as $$V_O = E \quad (1a)$$

The signal comparator 28 includes a circuit for making a level comparison between the voltage $V_1$ applied thereto through the first power supply circuit 22a when the main switch 21 of the projection display apparatus 10 is turned on and a voltage $V_C$ corresponding to the amount of electrical charge accumulated in the capacitor 32 and outputted from the time management section 27. If $V_C \leq V_1$, the signal comparator 28 outputs the "low" signal. If $V_C > V_1$, the signal comparator 28 outputs the "high" signal. The signal outputted from the signal comparator 28 is applied to the terminal L4 of the controller 23.

Figure 3:
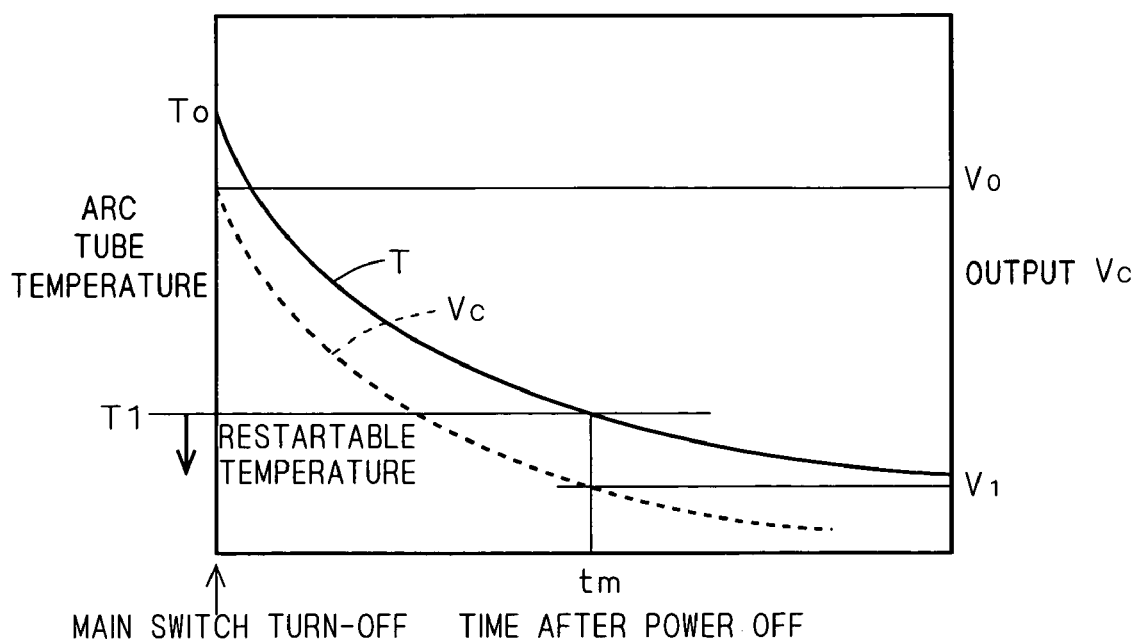
FIG. 3 shows a relationship between an arc tube temperature and cooling time for a lamp, and a relationship between an output voltage from the time management section and discharge time.

FIG. 3 shows a relationship between the temperature of the arc tube 14 and the cooling time for the lamp 11, and a relationship between the output voltage $V_C$ from the time management section 27 and the discharge time during which the capacitor 32 is discharged. The temperature of the arc tube 14 of the lamp 11 is very high during the projection of images in the projection display apparatus 10, and the maximum temperature $T_O$ of the outer wall surface of the arc tube 14 reaches 900 to 1000° C. When the main switch 21 is turned off to cut off the power supply to the lamp 11, the temperature T of the arc tube 14 allowed to cool down (due to only heat dissipation without driving the fan 5) decreases natural-logarithmically. The restartability of the discharge lamp is related to the pressure in the arc tube 14. Because the discharge lamp is unable to restart under the conditions of high temperature and high pressure in the tube, there should be an elapse of time until the arc tube 14 is cooled down to a given temperature (e.g., temperature T1) or lower for the subsequent turn-on of the lamp 11. On the other hand, the discharge of the capacitor 32 also exhibits a natural-logarithmic curve of voltage decay ($V_C$ in FIG. 3). Therefore, when design is selected so that the time required for the lamp 11 to reach a restartable temperature is equal in length to the discharge time of the capacitor 32 until the output voltage $V_C$ reaches the predetermined voltage $V_1$, the temperature of the arc tube 14 is approximately grasped indirectly from the output voltage $V_C$ from the time management section 27.

The output voltage $V_C$ from the time management section 27 is a voltage across the capacitor 32. From the capacitance C of the capacitor 32 and the resistance R of the resistor 33, the discharge time t of the capacitor 32 is given by $$t = -CR \ln(V_1/V_O) \quad (2)$$

where $V_O$ is the voltage before the discharge of the capacitor 32, and $V_1$ is the output voltage from the capacitor 32 corresponding to the time required for the arc tube 14 of the lamp 11 to change from the temperature $T_O$ immediately after the turn-off of the main switch 21 to the restartable temperature T1.

When the main switch 21 turns on, the first power supply circuit 22a outputs the voltage $V_1$ on which the discharge time is based. The signal comparator 28 makes the voltage level comparison between the voltage $V_C$ outputted from the time management section 27 and the reference voltage $V_1$. When the temperature of the arc tube 14 of the lamp 11 is lower than the restartable temperature T1 when the main switch 21 is turned on again after being turned off, the signal comparator 28 outputs the "low" signal because $V_C \leq V_1$. When the temperature of the arc tube 14 remains higher than the restartable temperature T1, the signal comparator 28 outputs the "high" signal because $V_C > V_1$. The signal outputted from the signal comparator 28 is applied to the terminal L4 of the controller 23.

If the signal applied to the terminal L4 of the controller 23 is the "low" signal, the lamp 11 normally turns on when the function switch 26a of the manipulation section 26 is immediately turned on because the arc tube 14 of the lamp 11 reaches the restartable temperature. Therefore, when the function switch 26a is turned on, with the "low" signal applied to the terminal L4, the controller 23 immediately turns on the lamp 11 to start the image projection operation of the projection display apparatus 10.

In contrast, if the signal applied to the terminal L4 of the controller 23 is the "high" signal, the lamp 11 is unable to turn on until the arc tube 14 of the lamp 11 is cooled down to the restartable temperature. To decrease the temperature of the arc tube 14 of the lamp 11, the controller 23 transmits the drive signal to the fan drive section 25 to drive the fan 5 for a certain period of time to cool the lamp 11. After the cooling for the certain period of time by the fan 5, the controller 23 turns on the lamp 11 based on the turn-on operation of the function switch 26a to start the image projection operation of the projection display apparatus 10.

Thus, the projection display apparatus 10 uses the functions of the time management section 27, the signal comparator 28 and the controller 23 to judge whether the temperature of the arc tube 14 is higher or lower than the predetermined value when restarting the lamp 11 after the turn-off of the lamp 11. When it is judged that the temperature of the arc tube 14 is higher than the predetermined value, the projection display apparatus 10 is constructed to perform the operation of turning on the lamp 11 after the lamp 11 is cooled by the fan 5. When it is judged that the temperature of the arc tube 14 is lower than the predetermined value, the projection display apparatus 10 is constructed to immediately turn on the lamp 11 without cooling the lamp 11 by the fan 5. If required cooling time is not ensured after the turn-off of the lamp 11 due to an accident such as power failure or the removal of a power cord, the above-mentioned construction cools the lamp 11 sufficiently before the next turn-on of the lamp 11, thereby to achieve the satisfactory restart of the lamp 11 without the degradation of the lamp 11. Further, if the lamp 11 is sufficiently cooled when the lamp 11 is to be turned on next, the lamp 11 can be turned on immediately. This achieves the smooth turn-on of the lamp 11.

The timer circuit of the time management section 27 includes the capacitor 32 and the resistor 33. The timer function, which is implemented by charging and discharging the capacitor 32, is effectively performed by the discharging action of the capacitor 32 even when the main switch 21 is off. The charging of the capacitor 32 is started in operative association with the turn-on of the lamp 11, and the discharging of the capacitor 32 is started in operative association with the turn-off of the lamp 11. Thus, the capacitor 32 performs the charging and discharging operations approximately coincident with temperature changes of the arc tube 14.

In particular, the time management section 27 can always output the voltage $V_C$ corresponding to the temperature of the arc tube 14 by making setting so that the time required for the output voltage $V_C$ from the capacitor 32 to reach the predetermined value by the discharging of the capacitor 32 is equal in length to the time required for the arc tube 14 to be allowed to cool down to the restartable temperature. Therefore, the temperature of the lamp 11 is grasped based on the output voltage $V_C$ from the time management section 27, and an accurate judgment is made as to whether the temperature of the arc tube 14 is higher or lower than the predetermined value, when restarting the lamp 11 after the turn-off of the lamp 11.

Figure 4:
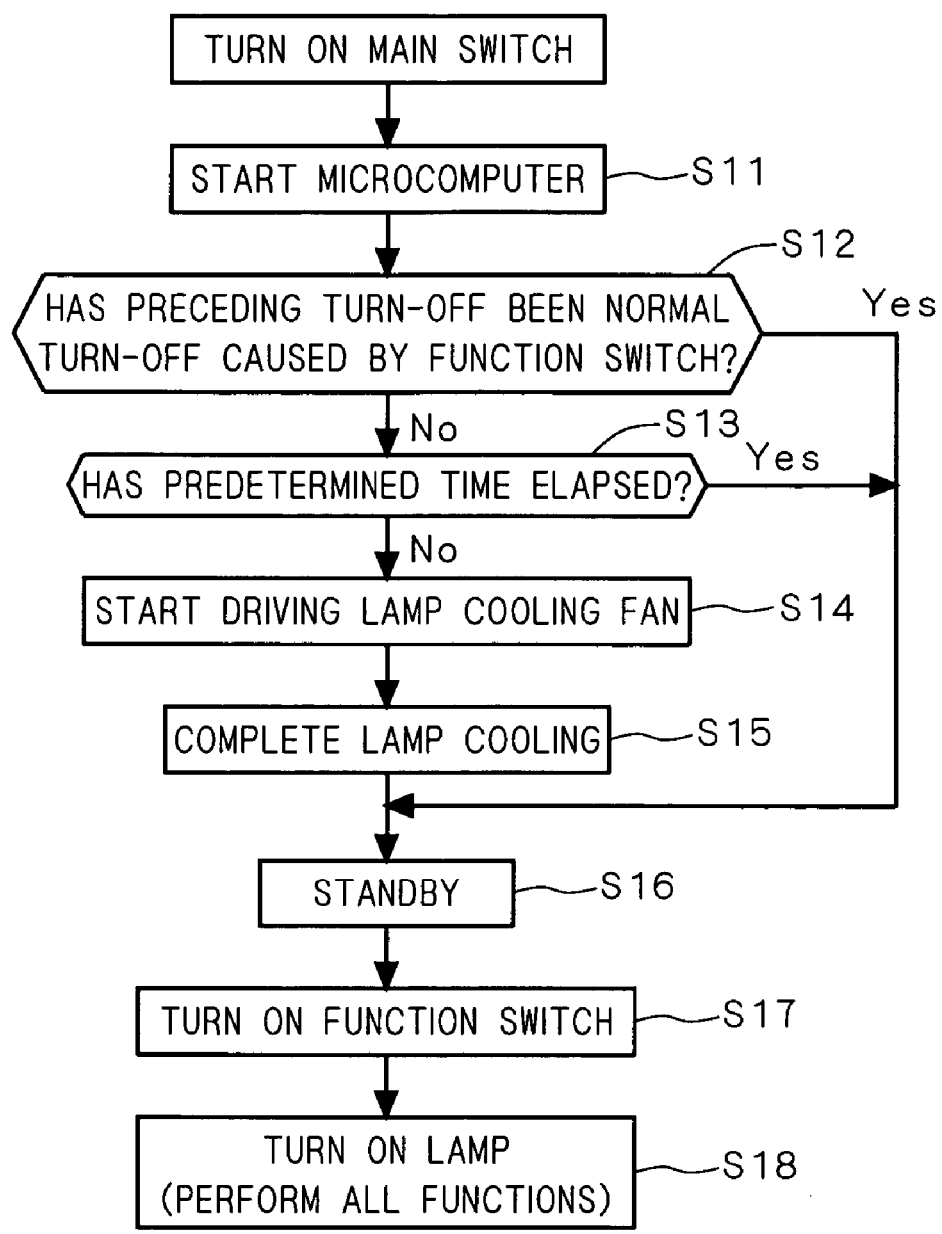
FIG. 4 is a first flowchart showing the operation of a controller according to the first preferred embodiment.

The operation of the projection display apparatus 10 constructed as mentioned above will described. FIG. 4 is a first flowchart showing the operation of the controller 23 according to the first preferred embodiment. For projection of images on the screen 4 by the projection display apparatus 10, a user initially turns on the main switch 21 to start the microcomputer (in Step S11).

The microcomputer of the controller 23 stores information about the preceding termination status of the projection display apparatus 10. In Step S12, the controller 23 checks whether the preceding turn-off of the projection display apparatus 10 has been normal turn-off caused by the function switch 26a of the manipulation section 26 or turn-off (referred to hereinafter as abnormal turn-off) caused by the main switch 21. The abnormal turn-off includes occasions where the projection display apparatus 10 is turned off by other than the function switch 26a, for example, the turn-off due to the removal of a power cable of the projection display apparatus 10 and the turn-off due to power failure in addition to the turn-off operation by means of the main switch 21. When the projection display apparatus 10 has been turned off by the function switch 26a of the manipulation section 26, the fan 5 is driven for a certain period of time after the turn-off of the lamp 11 to cool the arc tube 14 down to the restartable temperature. Thereafter, the fan 5 is stopped, and information about the normal turn-off is stored in the microcomputer of the controller 23. On the other hand, when the projection display apparatus 10 has been turned off by the main switch 21 or when the main switch 21 is turned off in the course of fan cooling although the projection display apparatus 10 is turned off by the function switch 26a of the manipulation section 26, it is judged that an abnormal turn-off operation in which the lamp 11 is not sufficiently cooled has been done, and information so indicating is stored in the microcomputer. When the projection display apparatus 10 has been normally turned off, the controller 23 judges that the answer to Step S12 is Yes, and the processing proceeds to Step S16, in which the projection display apparatus 10 stands by for the turn-on operation of the function switch 26a of the manipulation section 26. When the projection display apparatus 10 has been abnormally turned off, on the other hand, the controller 23 judges that the answer to Step S12 is No, and the processing proceeds to Step S13.

In Step S13, the controller 23 diagnoses the condition of the time management section 27. When the output voltage $V_C$ from the time management section 27 is not higher than the reference voltage $V_1$, the "low" signal is outputted from the signal comparator 28. Then, the controller 23 judges that the arc tube 14 has been cooled down to the restartable temperature, and the processing proceeds (from the "Yes" branch of Step S13) to Step S16, in which the projection display apparatus 10 stands by for the turn-on operation of the function switch 26a of the manipulation section 26. When the output voltage $V_C$ from the time management section 27 is higher than the reference voltage $V_1$, on the other hand, the "high" signal is outputted from the signal comparator 28. Then, the controller 23 judges that the arc tube 14 has not yet been cooled down to the restartable temperature, and the processing proceeds (from the "No" branch of Step S13) to Step S14.

In Step S14, the controller 23 transmits the drive signal to the fan drive section 25 to drive the fan 5 for a certain period of time, thereby cooling the arc tube 14 down to the restartable temperature. After the completion of the cooling in Step S15, the processing proceeds to Step S16, in which the projection display apparatus 10 stands by for the turn-on operation of the function switch 26a of the manipulation section 26.

When the function switch 26a of the manipulation section 26 is turned on in Step S17, the processing proceeds to Step S18, in which the controller 23 turns on the lamp 11, drives the fan 5, and outputs the image signal to the light modulator, thereby to start the image projection operation of the projection display apparatus 10.

Figure 5:
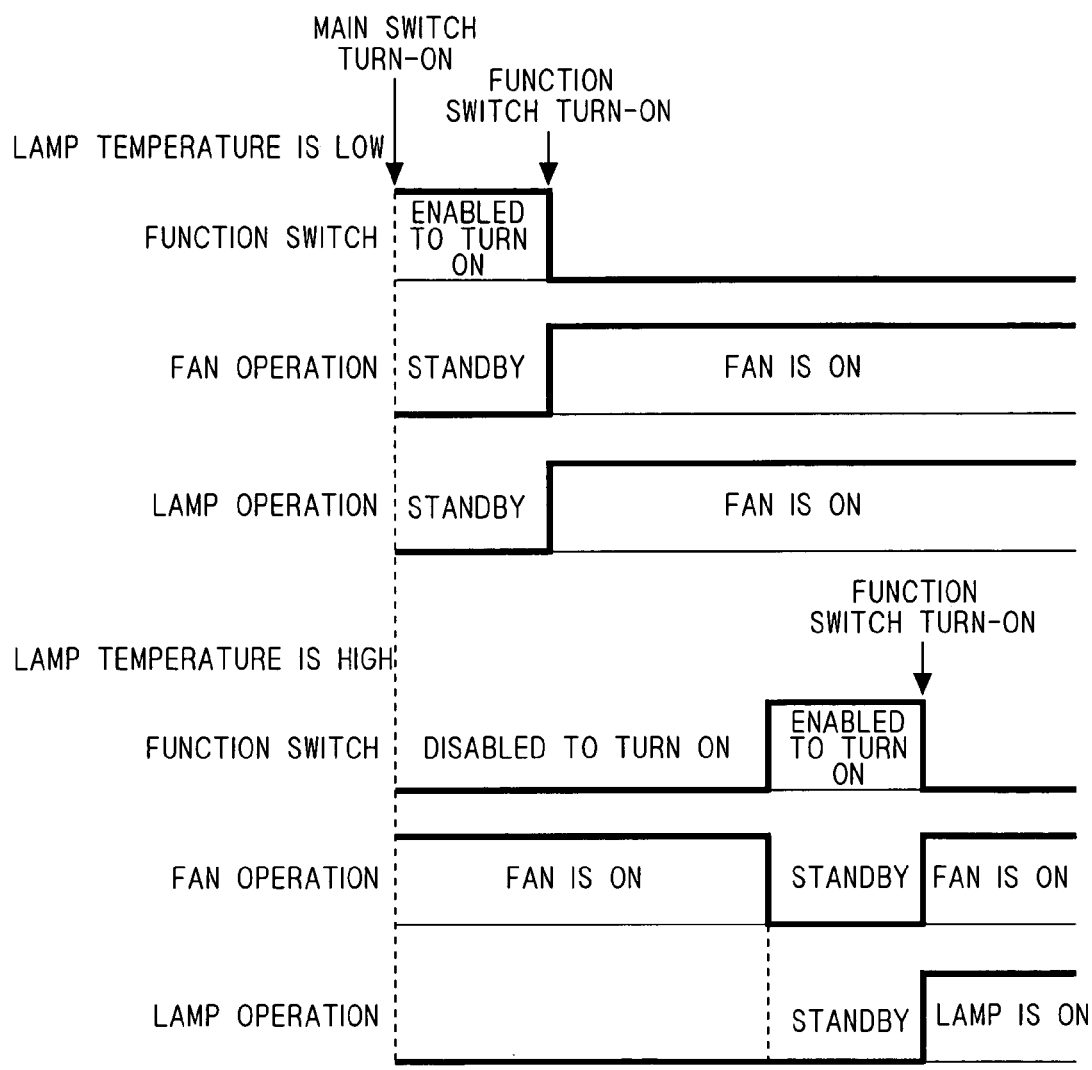
FIG. 5 is a timing chart showing a turn-on sequence in accordance with the first flowchart.

FIG. 5 is a timing chart showing a turn-on sequence in accordance with the first flowchart. The start-up of the projection display apparatus 10 under conditions of low temperature of the arc tube 14 is as follows. As soon as the main switch 21 is turned on, the projection display apparatus 10 enters a standby state in which the turn-on operation of the function switch 26a of the manipulation section 26 is enabled. When the function switch 26a of the manipulation section 26 is turned on, the lamp 11 immediately turns on, and the fan 5 is driven. Thus, the projection display apparatus 10 starts the image projection operation.

In contrast, the start-up of the projection display apparatus 10 under conditions of high temperature of the arc tube 14 is as follows. After the main switch 21 is turned on, the fan 5 initially operates to cool the arc tube 14 for a certain period of time until the temperature of the arc tube 14 reaches the restartable temperature. Over this period of time, the turn-on operation of the function switch 26a of the manipulation section 26 is disabled. After the completion of the cooling for this period of time, the projection display apparatus 10 enters a standby state in which the turn-on operation of the function switch 26a is enabled. Thereafter, when the function switch 26a is turned on, the projection display apparatus 10 performs the image projection function in response thereto.

An example of the specific design will be described. A 270-W high-pressure mercury lamp was used as the lamp 11. The 270-W lamp 11 was approximately 100% restartable at the arc tube temperature of 350° C. or lower. When the lamp 11 was turned off by turning off the function switch 26a of the manipulation section 26 and was then cooled by the fan 5, the temperature of the arc tube 14 decreased to 350° C. or lower for 50 seconds. When the lamp 11 was turned off by the main switch 21 and the fan 5 was stopped simultaneously with the turn-off of the lamp 11, it took 2.5 minutes or longer for the arc tube 14 to be allowed to cool down to 350° C. Therefore, the period of time that the restart of the lamp 11 was disabled was set at about five minutes in consideration for variations of natural cooling of the lamp 11 depending on use environments, and variations of the capacitor 32 and the resistor 33.

The discharge time t is set at 291 seconds (or about five minutes) from Equations (1) and (2), when the settings are as follows: E=5 V, $V_F$=0.7 V, C=1000 μF, R=200 kΩ, and $V_1$=1 V.

Under these design conditions, the cooling conditions and temperature management time are set as follows: about one minute of cooling fan drive time after the lamp 11 is turned off by turning off the function switch 26a (i.e., normal turn-off); about five minutes of arc tube temperature management time after the lamp-off (or discharge time of the capacitor 32); and about one minute of cooling time by the fan 5 when the main switch 21 is turned on under the conditions of high arc tube temperature. Thus, before a lapse of about five minutes since the turn-off of the lamp 11 if abnormal turn-off occurs, it is judged that the temperature of the arc tube 14 is high, and the lamp 11 is cooled by the fan 5 for about one minute prior to the restart of the lamp 11.

Figure 6:
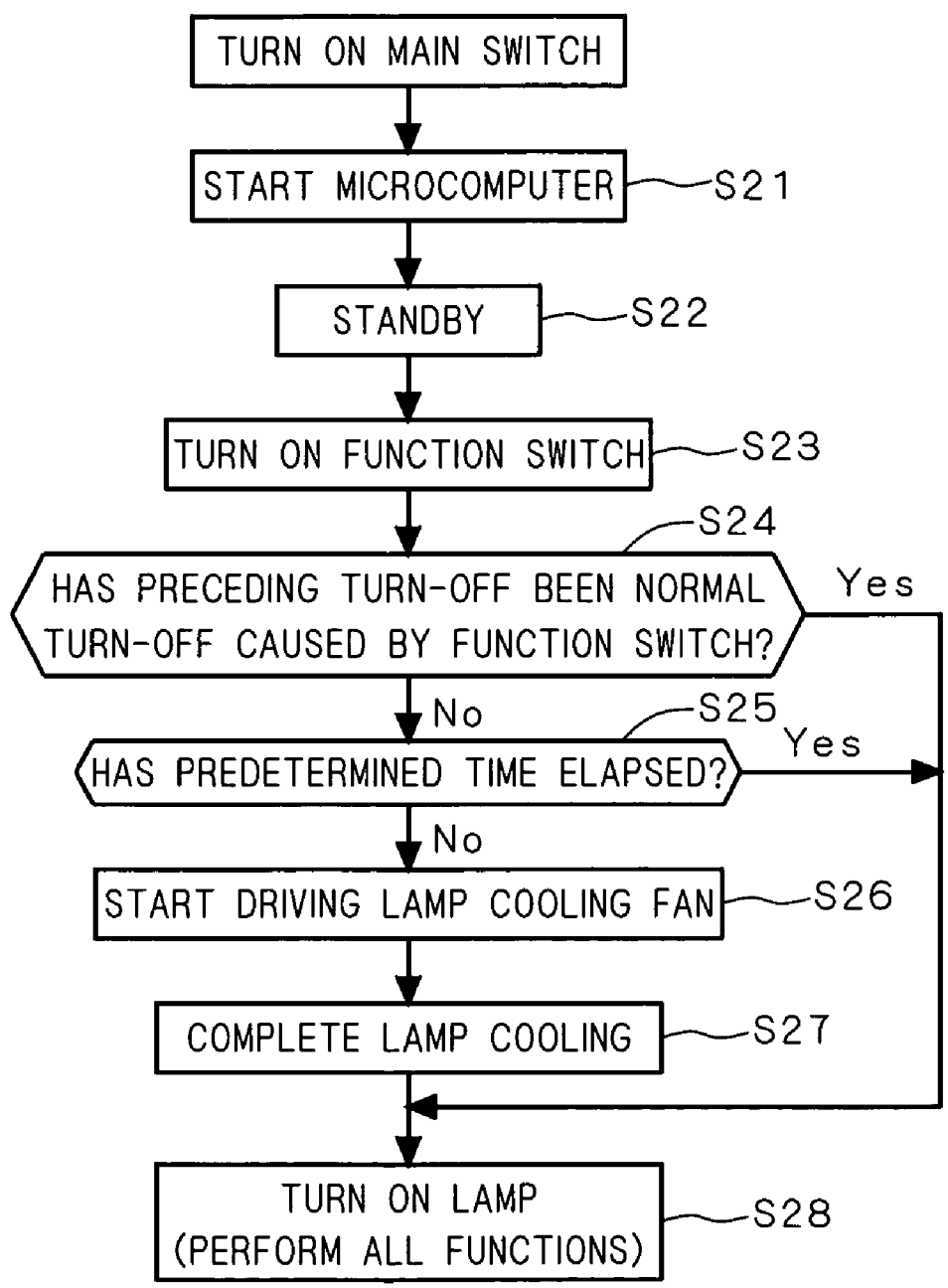
FIG. 6 is a second flowchart showing the operation of the controller according to the first preferred embodiment.

FIG. 6 is a second flowchart showing the operation of the controller 23 according to the first preferred embodiment. Also according to this flowchart, the microcomputer is started in Step S21 after the main switch 21 is turned on. The second flowchart differs from the first flowchart in that the projection display apparatus 10 initially enters a standby state independently of the output signal from the signal comparator 28 (in Step S22). After the function switch 26a of the manipulation section 26 is turned on (in Step S23), a judgment is made as to whether the preceding turn-off operation has been normal or not (in Step S24). When the normal turn-off has been performed, the processing proceeds to Step S28. In Step S28, the controller 23 turns on the lamp 11, drives the fan 5, and outputs the image signal to the light modulator to activate the image projection function of the projection display apparatus 10, thereby starting the image projection onto the screen 4.

On the other hand, when the preceding termination has been abnormal turn-off (or the answer to Step S24 is No), the processing proceeds to Step S25, in which the controller 23 diagnoses the condition of the time management section 27. When the output voltage $V_C$ from the time management section 27 is not higher than the reference voltage $V_1$, the "low" signal is outputted from the signal comparator 28. Then, the controller 23 judges that the arc tube 14 has been cooled down to the restartable temperature, and the processing proceeds (from the "Yes" branch of Step S25) to Step S28, in which the controller 23 turns on the lamp 11 to activate the image projection function. When the output voltage $V_C$ from the time management section 27 is higher than the reference voltage $V_1$, on the other hand, the "high" signal is outputted from the signal comparator 28. Then, the controller 23 judges that the arc tube 14 has not yet been cooled down to the restartable temperature, and the processing proceeds (from the "No" branch of Step S25) to Step S26.

In Step S26, the controller 23 transmits the drive signal to the fan drive section 25 to drive the fan 5 for a certain period of time, thereby cooling the arc tube 14 down to the restartable temperature. After the completion of the cooling in Step S27, the processing proceeds to Step S28, in which the controller 23 turns on the lamp 11 to activate the image projection function.

Figure 7:
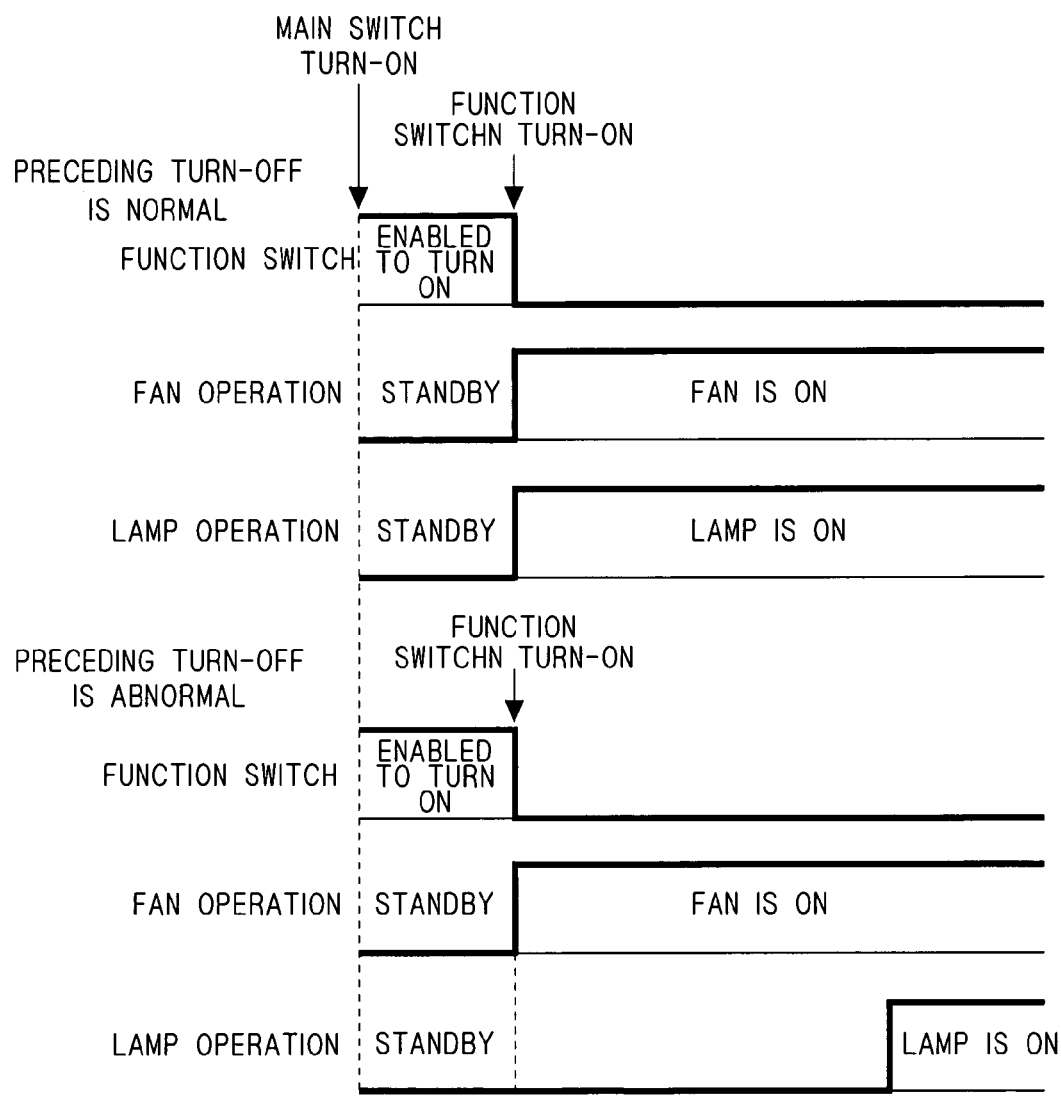
FIG. 7 is a timing chart showing a turn-on sequence in accordance with the second flowchart.

FIG. 7 is a timing chart showing a turn-on sequence in accordance with the second flowchart. The start-up of the projection display apparatus 10 under conditions of low temperature of the arc tube 14 is similar to that in the turn-on sequence of the first flowchart (FIG. 5). The start-up of the projection display apparatus 10 under conditions of high temperature of the arc tube 14 is as follows. After the function switch 26a of the manipulation section 26 is turned on, the lamp 11 is cooled. After the cooling of the lamp 11 for a certain period of time, the lamp 11 is automatically turned on.

In accordance with the first flowchart, the function switch 26a of the manipulation section 26 is not allowed to turn on until the fan 5 stops cooling if the temperature of the arc tube 14 is high. However, in accordance with the second flowchart, the function switch 26a of the manipulation section 26 is allowed to turn on independently of whether the preceding turn-off is normal or abnormal. This achieves smooth turn-on of the lamp 11.

Figure 8:
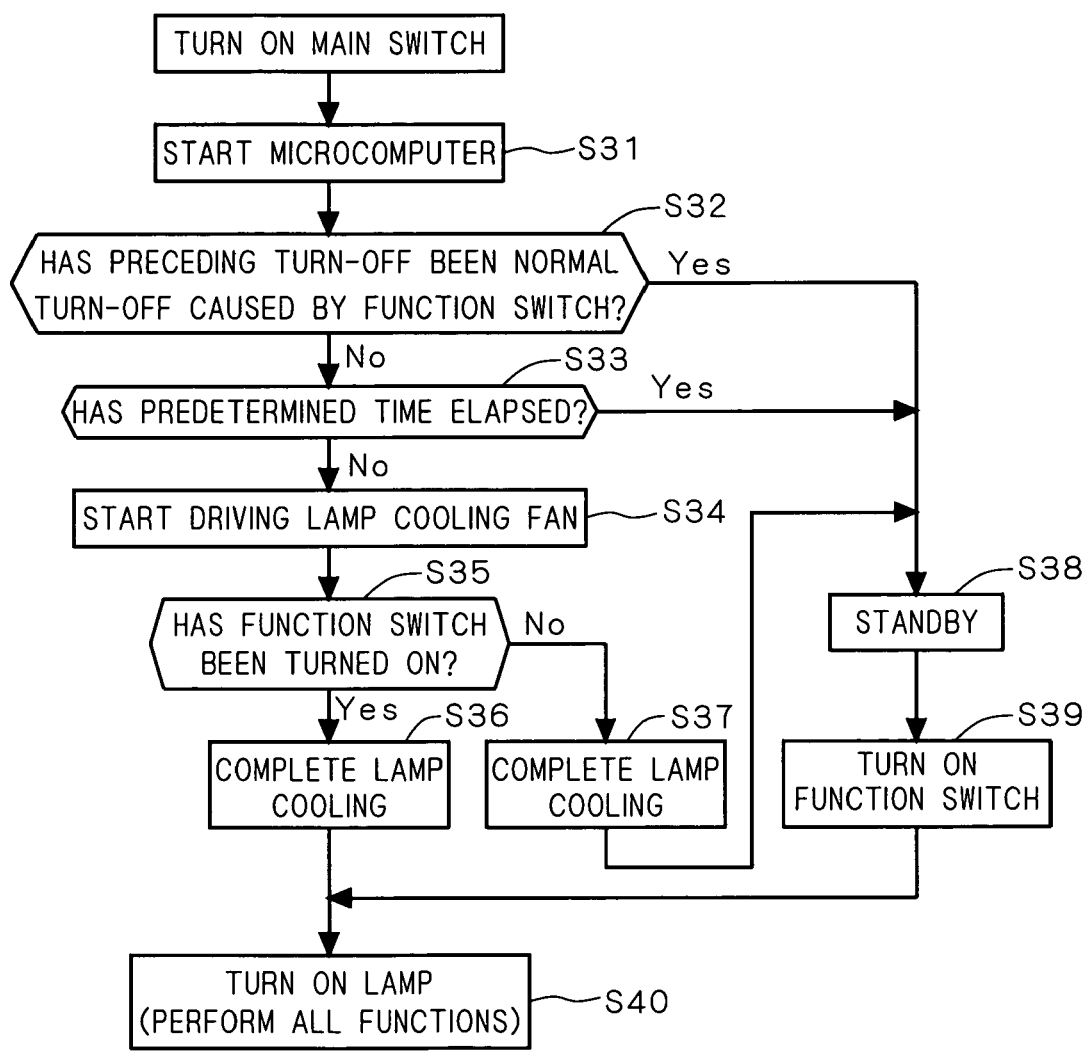
FIG. 8 is a third flowchart showing the operation of the controller according to the first preferred embodiment.

FIG. 8 is a third flowchart showing the operation of the controller 23 according to the first preferred embodiment. The microcomputer of the controller 23 is started in Step S31 after the main switch 21 is turned on. As in the first flowchart, when the preceding turn-on is abnormal (or the answer to Step S32 is No) and the output voltage from the time management section 27 is high (or the answer to Step S33 is No), the fan 5 is driven to cool the lamp 11 (in Step S34). The third flowchart differs from the first flowchart in accepting the operation of the function switch 26a of the manipulation section 26 in Step S35 even during the cooling by the fan 5. When the function switch 26a of the manipulation section 26 is turned on in Step S35 (or the answer to Step S35 is Yes), the processing proceeds to Steps S36 and S40, in which after the completion of the cooling of the lamp 11, the controller 23 automatically turns on the lamp 11 to start the image projection on the screen 4.

On the other hand, when the function switch 26a is not turned on in Step S35, the cooling of the lamp 11 is completed (in Step S37), and thereafter the projection display apparatus 10 enters the standby state pending the turn-on operation of the function switch 26a of the manipulation section 26 (in Step S38). Then, when the function switch 26a of the manipulation section 26 is operated to turn on (Step S39), the processing proceeds to Step S40, in which the controller 23 turns on the lamp 11 to start the image projection on the screen 4.

Figure 9:
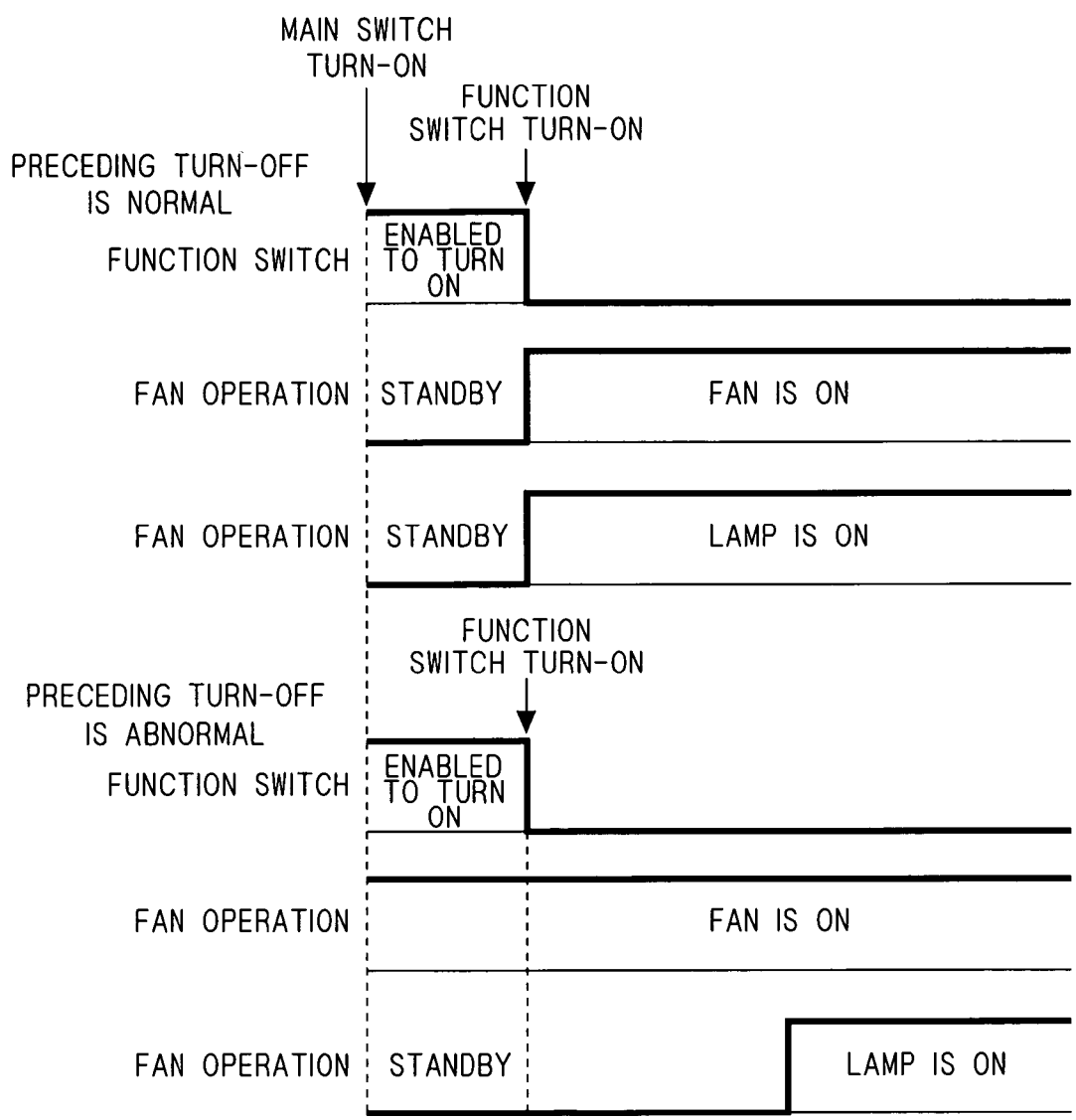
FIG. 9 is a timing chart showing a turn-on sequence in accordance with the third flowchart.

FIG. 9 is a timing chart showing a turn-on sequence in accordance with the third flowchart. The start-up of the projection display apparatus 10 under conditions of low temperature of the arc tube 14 is similar to that in the turn-on sequence of the first flowchart (FIG. 5). The start-up of the projection display apparatus 10 under conditions of high temperature of the arc tube 14 is as follows. First, the controller 23 drives the fan 5 to start the cooling of the lamp 11, and is now ready to accept the operation of the function switch 26a. Then, when the function switch 26a of the manipulation section 26 is turned on during the cooling of the lamp 11, the lamp 11 is automatically turned on after the completion of the cooling for a certain period of time continued after the turn-on of the main switch 21.

In accordance with the third flowchart, when the main switch 21 is turned on under conditions of high temperature of the arc tube 14, the fan cooling of the lamp 11 starts, and the operation of the function switch 26a is enabled during the fan cooling of the lamp 11. This reduces the time interval between the turn-on of the function switch 26a and the turn-on of the lamp 11, as compared with the second flowchart.

As described hereinabove, the projection display apparatus 10 according to the first preferred embodiment is capable of managing the temperature of the lamp 11 at the time that the main switch 21 is turned on, thereby to cool the lamp 11 by means of the fan 5 depending on the temperature of the arc tube 14. Specifically, when it is judged that the temperature of the arc tube 14 is higher than the predetermined value based on the output from the time management section 27 at the time of restart of the lamp 11 after the lamp 11 is turned off, the lamp 11 is cooled by the fan 5, and thereafter the lamp 11 starts the turn-on operation based on the turn-on of the function switch 26a. When it is judged that the temperature of the arc tube 14 is lower than the predetermined value, the lamp 11 starts the turn-on operation as soon as the function switch 26a is turned on. Therefore, the projection display apparatus 10 according to the first preferred embodiment can restart the lamp 11 smoothly without degradation of the lamp 11.

In the above-mentioned flowcharts, whether the preceding termination operation has been normal termination or abnormal termination is judged prior to the turn-on of the lamp 11, and the lamp temperature is judged based on the output from the time management section 27 when the result of judgment is the abnormal termination. This allows the immediate restart of the lamp 11 when the normal lamp cooling has been performed in the preceding termination operation even if the time interval is short between the turn-off of the lamp 11 and the restart thereof, thereby achieving smooth restart of the lamp 11.

Second Preferred Embodiment

Figure 10:
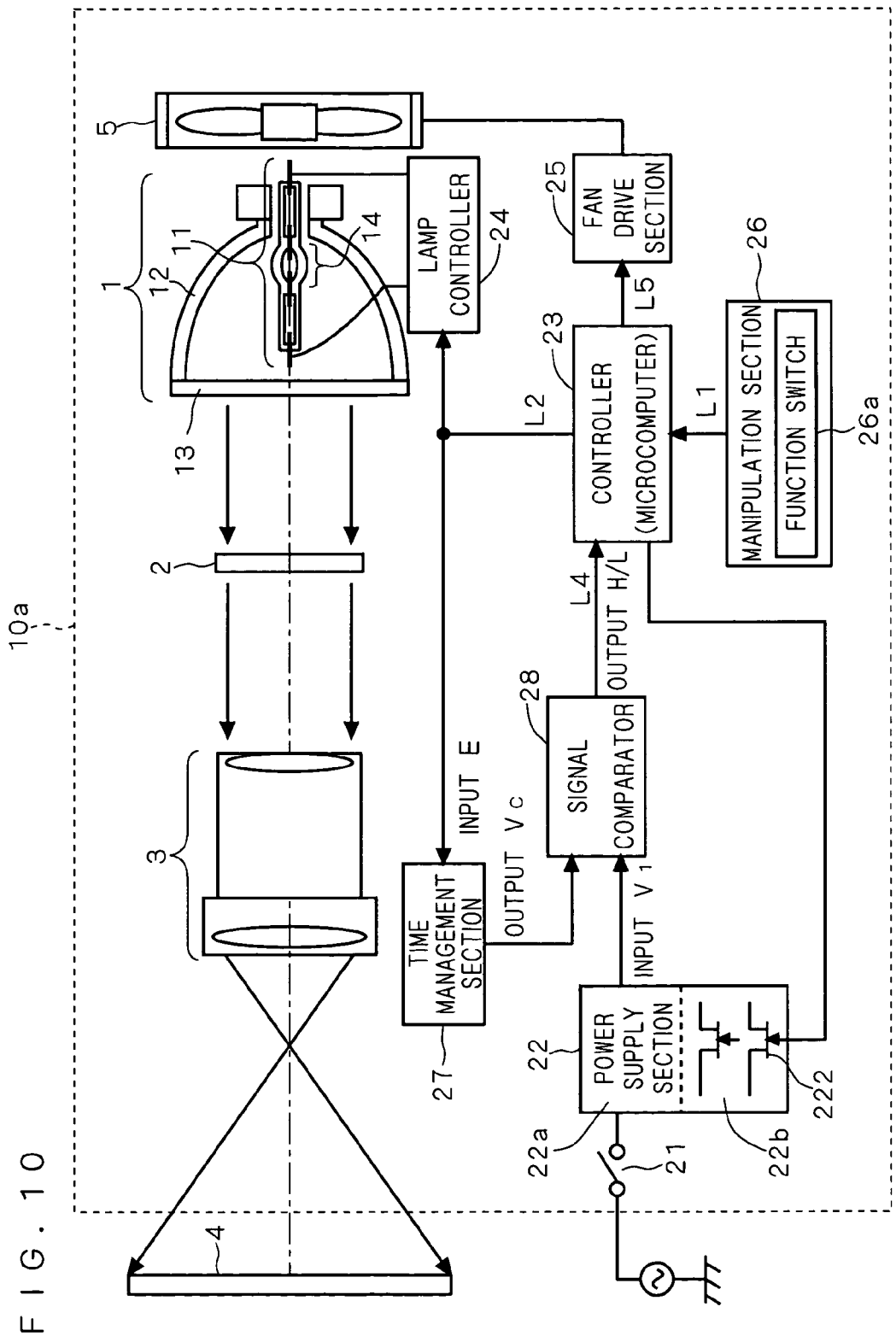
FIG. 10 schematically shows the construction of the projection display apparatus according to a second preferred embodiment of the present invention.

FIG. 10 schematically shows the construction of a projection display apparatus 10a according to a second preferred embodiment of the present invention. In FIG. 10, components designated by the same reference numerals and characters as in FIG. 1 are identical in function with those of the first preferred embodiment. In the example of construction shown in FIG. 1 according to the first preferred embodiment, the terminal L2 of the controller 23 for providing the output to the lamp controller 24 is operatively associated with the terminal L3 of the controller 23 for providing the output through the second power supply circuit 22b to the time management section 27.

As shown in FIG. 10, the output terminal L2 of the controller 23 according to the second preferred embodiment is connected in a branched configuration to the lamp controller 24 and to the time management section 27 so that the controller 23 controls both of the lamp controller 24 and the time management section 27 by the use of an output signal through the terminal L2. Specifically, the controller 23 causes the time management section 27 to start the charging by the use of the drive signal outputted to the lamp controller 24 to turn on the lamp 11. When the controller 23 transmits the drive signal which is the output voltage E from the terminal L2 in order to turn on the lamp 11, the drive signal causes the lamp 11 to turn on and causes the start of charging of the capacitor 32 (See FIG. 2) in the time management section 27 at the same time. When the voltage supply to the terminal L2 is cut off (i.e., E=0), the lamp 11 turns off and the discharge of the capacitor 32 starts in the time management section 27 at the same time. Other constructions are similar to those described in the first preferred embodiment.

The projection display apparatus 10a having above-mentioned construction produces effects similar to those of the first preferred embodiment, and also can effect both the turn-on control of the lamp 11 and the charging and discharging control of the time management section 27 at a time by the use of the single output signal from the controller 23. In the projection display apparatus 10a, therefore, the controller 23 can more directly control both the lamp controller 24 and the time management section 27. This achieves a simplified circuit configuration.

A construction other than those of the first and second preferred embodiments may be employed if the input $V_1$ to the signal comparator 28 is connected to a signal line to which voltage is supplied when the main switch 21 is turned on, and the input E to the time management section 27 is connected to a signal line to which no voltage is supplied when the projection display apparatus 10a is in the standby state (or the lamp 11 is off) caused by the turn-on of the main switch 21 but to which voltage is supplied when the function switch 26a of the manipulation section 26 is turned on to operate the lamp controller 24.

Lower capacity of current which can be supplied from the terminal L2 of the controller 23 requires longer time to charge the capacitor 32 of the time management section 27. In such a case, therefore, it is desirable to connect the terminal L2 of the controller 23 to the input of the time management section 27 through a path with high current capacity (e.g., the switching element 222 of the second power supply circuit 22b) following a point of branching off from the line to the lamp controller 24.

Third Preferred Embodiment

Figure 11:
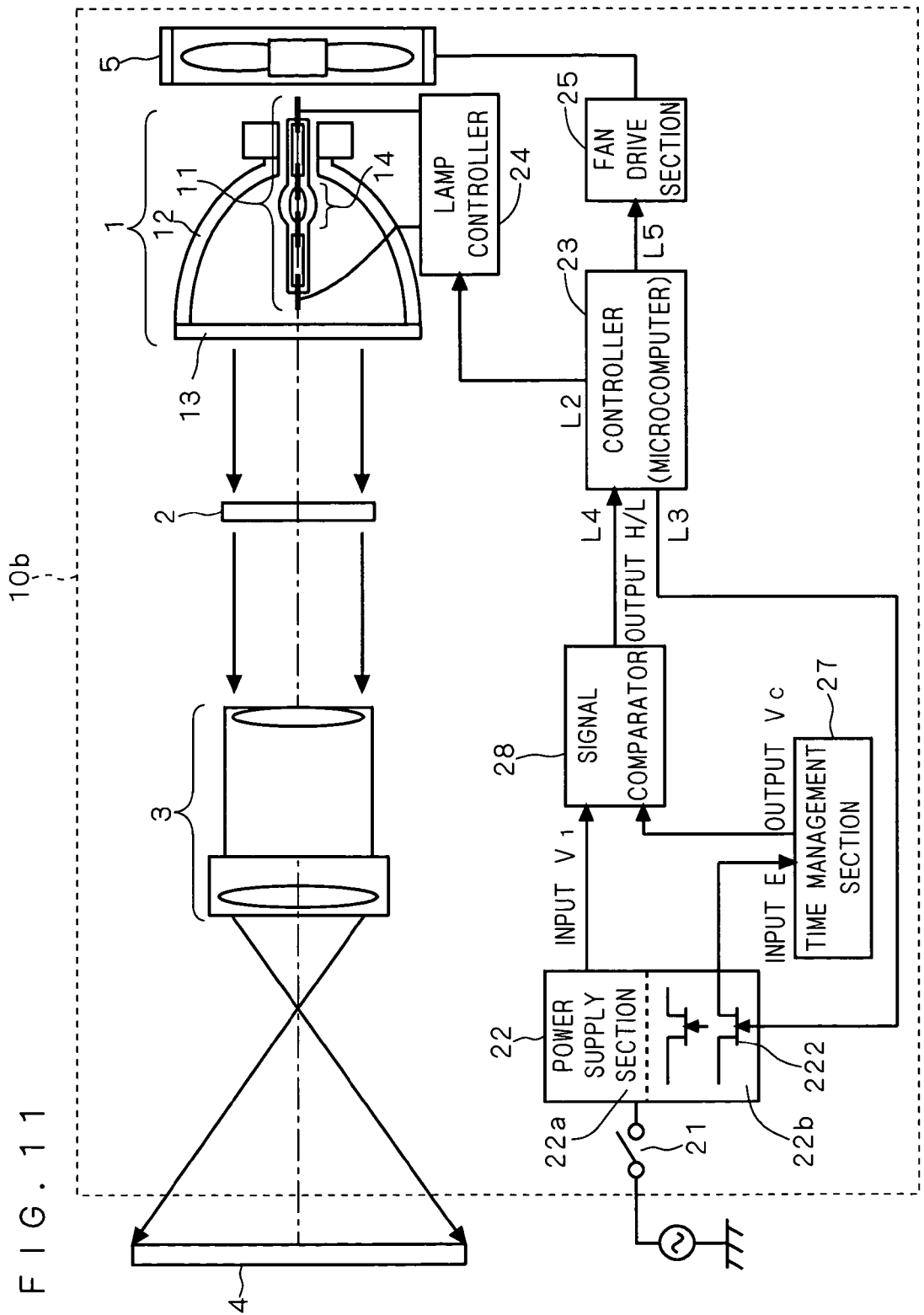
FIG. 11 schematically shows the construction of the projection display apparatus according to a third preferred embodiment of the present invention.

FIG. 11 schematically shows the construction of a projection display apparatus 10b according to a third preferred embodiment of the present invention. In FIG. 11, components designated by the same reference numerals and characters as in FIG. 1 are identical in function with those of the first preferred embodiment. The projection display apparatus 10b differs from the projection display apparatus 10 of the first preferred embodiment in that the function switch 26a of the manipulation section 26 is removed so that the image projection function is activated and inactivated by the use of only the main switch 21. Other constructions are similar to those described in the first preferred embodiment.

Because the projection display apparatus 10b according to the third preferred embodiment does not include the function switch 26a, all of the functions of the projection display apparatus 10b (except the function of the time management section 27) are always stopped without the fan cooling, after the lamp 11 is turned off by turning off the main switch 21. Then, when the main switch 21 is turned on for the next turn-on to start the power supply, the projection display apparatus 10b starts. When the temperature of the arc tube 14 is low at this time, the lamp 11 is immediately turned on, whereby the projection display apparatus 10b starts performing the image projection function. On the other hand, when the temperature of the arc tube 14 is high, the fan 5 is driven to cool the lamp 11 for a certain period of time, and thereafter the lamp 11 is turned on, whereby the projection display apparatus 10b starts performing the image projection function.

Figure 12:
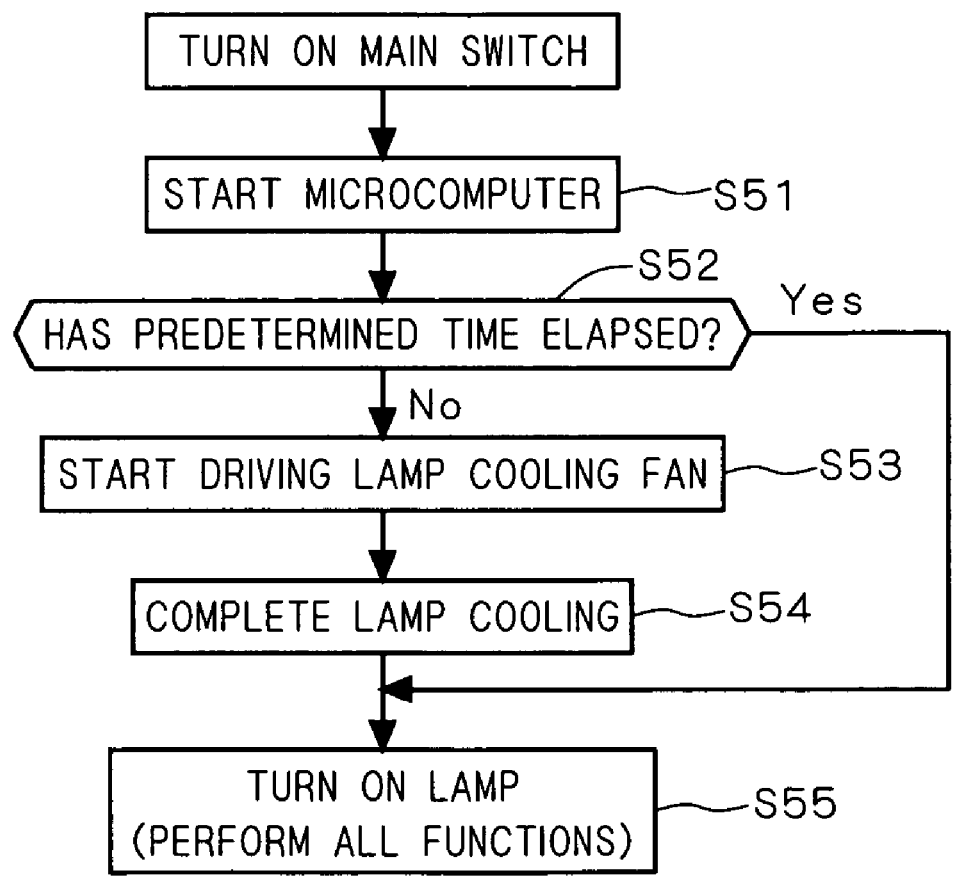
FIG. 12 is a flowchart showing the operation of the controller according to the third preferred embodiment.

FIG. 12 is a flowchart showing the operation of the controller 23 according to the third preferred embodiment. First, the main switch 21 is turned on to start the microcomputer of the controller 23 in Step S51. In Step S52, the controller 23 diagnoses the condition of the time management section 27. When the output voltage $V_C$ from the time management section 27 is not higher than the reference voltage $V_1$, the "low" signal is outputted from the signal comparator 28. Then, the controller 23 judges that the arc tube 14 has been cooled down to the restartable temperature, and the processing proceeds to Step S55, in which the controller 23 turns on the lamp 11 to activate the image projection function of the projection display apparatus 10b. When the output voltage $V_C$ from the time management section 27 is higher than the reference voltage $V_1$, on the other hand, the "high" signal is outputted from the signal comparator 28. Then, the controller 23 judges that the arc tube 14 has not yet been cooled down to the restartable temperature, and the processing proceeds to Step S53.

In Step S53, the controller 23 drives the fan 5 for cooling of the lamp 11, to cause the fan 5 to cool the lamp 11 for a certain period of time until the lamp 11 reaches the restartable temperature. After the completion of the cooling in Step S54, the processing proceeds to Step S55, in which the controller 23 turns on the lamp 11 to activate the image projection function of the projection display apparatus 10b.

According to the third preferred embodiment, whether the temperature of the arc tube 14 is high or low is always judged based on the output voltage $V_C$ from the time management section 27 before the lamp 11 is turned on in the projection display apparatus 10b. When it is judged that the temperature of the arc tube 14 is high, the lamp 11 is turned on after being cooled by the fan 5. When it is judged that the temperature of the arc tube 14 is low, the lamp 11 is immediately turned on. Since all of the functions of the projection display apparatus 10b can be immediately turned off, it is possible to stow away the projection display apparatus 10b quickly. Furthermore, the third preferred embodiment achieves smooth restart of the lamp 11 with less damage to the lamp 11, as in the first and second preferred embodiments.

Fourth Preferred Embodiment

Figure 13:
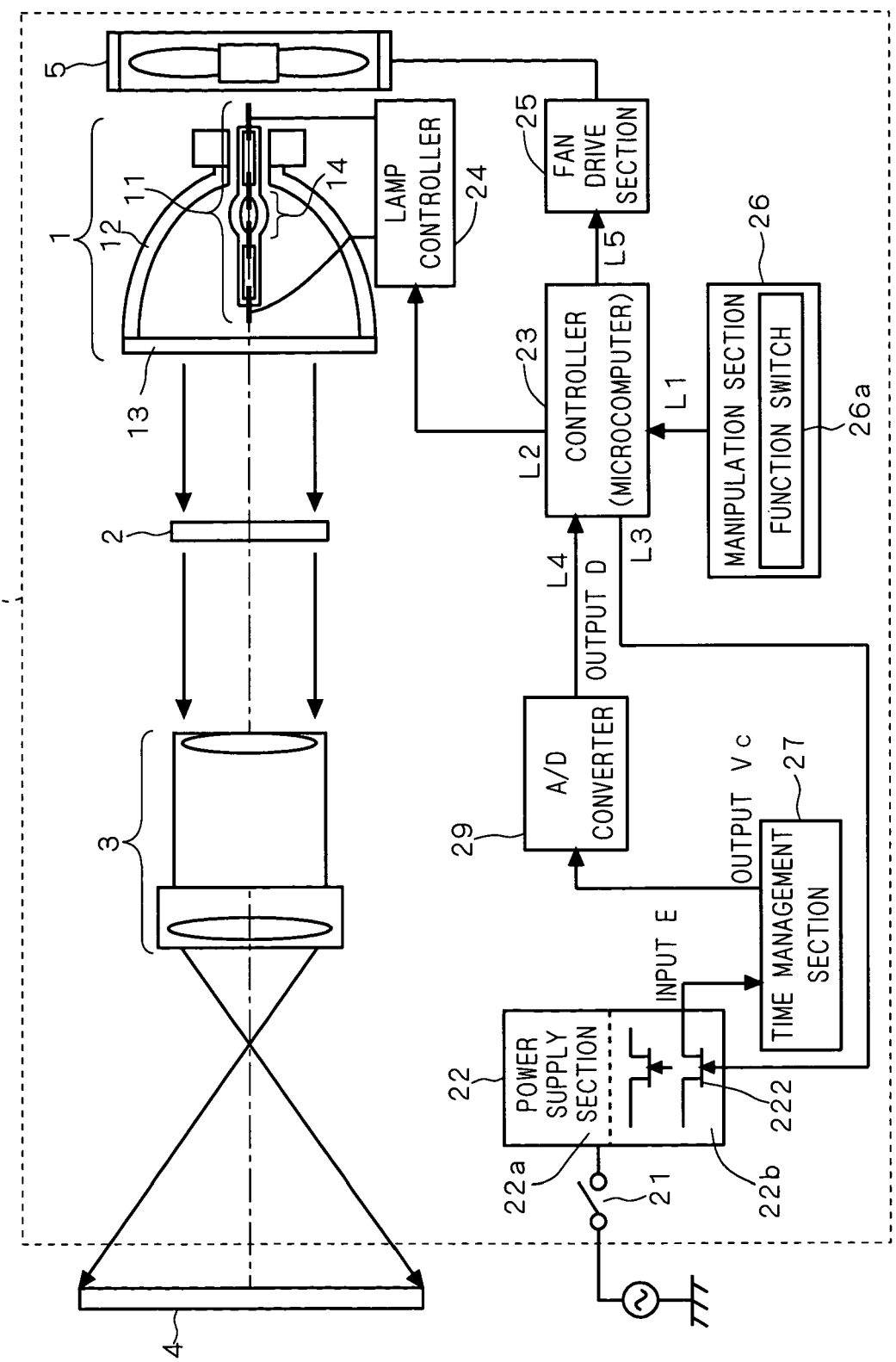
FIG. 13 schematically shows the construction of the projection display apparatus according to a fourth preferred embodiment of the present invention.

FIG. 13 schematically shows the construction of a projection display apparatus 10c according to a fourth preferred embodiment of the present invention. In FIG. 13, components designated by the same reference numerals and characters as in FIG. 1 are identical in function with those of the first preferred embodiment. The projection display apparatus 10c differs from the projection display apparatus 10 of the first preferred embodiment in that an A/D converter 29 is substituted for the signal comparator 28. The A/D converter 29 is connected to the output of the time management section 27. Other constructions are similar to those described in the first preferred embodiment. Alternatively, the projection display apparatus 10c may employ a microcomputer including a terminal having an A/D conversion function as the microcomputer of the controller 23, the terminal being connected directly to the output of the time management section 27. This eliminates the provision of the A/D converter 29 to achieve a simplified circuit configuration and cost reduction.

According to the first to third preferred embodiments described above, the "high" or "low" signal is inputted from the signal comparator 28 to the controller 23. According to the fourth preferred embodiment, on the other hand, the voltage $V_C$ outputted from the time management section 27 is converted by the A/D converter 29 into digital data D which in turn is inputted to the controller 23. The controller 23 determines the elapsed time since the turn-off of the lamp 11, based on the digital data D inputted from the A/D converter 29 in accordance with Equation (2) mentioned above. The controller 23 changes the cooling time (referred to hereinafter as "fan drive time") during which the fan 5 cools the lamp 11 depending on the determined elapsed time. That is, the controller 23 determines the fan drive time required to cool the arc tube 14 down to the restartable temperature (T1 of FIG. 3) based on the digital data D to control the fan drive section 25 to drive the fan 5 over the determined fan drive time.

If the elapsed time since the turn-off of the lamp 11 is short, a long period of fan drive time is set because the temperature of the arc tube 14 is high. If somewhat long time has elapsed although the time (tm of FIG. 3) required to allow the arc tube 14 to cool down to the restartable temperature T1 has not yet elapsed, a short period of fan drive time is set. If the time tm required to allow the arc tube 14 to cool down to the restartable temperature T1 has elapsed, the fan drive time is set at zero.

As an example, a conversion table showing a corresponding relationship between the fan drive time and the elapsed time since the turn-off of the lamp 11 is previously made and stored in the microcomputer of the controller 23. Upon receipt of the digital data D from the A/D converter 29, the controller 23 calculates the elapsed time since the turn-off of the lamp 11, based on the digital data D, and thereafter refers to the conversion table to determine the fan drive time.

FIG. 14 shows an example of the conversion table. A 100% restartable arc tube temperature was 350° C. or lower when a 270-W high-pressure mercury lamp was used. It took 2.5 minutes for the lamp 11 to be allowed to cool down to 350° C. after the lamp 11 was turned off. Assuming that the lamp 11 is cooled down to 300° C. in consideration for tolerance before the restart of the lamp 11, the time tm required to allow the lamp 11 to cool down to 300° C. after the lamp 11 is turned off is three minutes. A relationship between the elapsed time since the abnormal turn-off and the fan drive time required to cool the lamp 11 down to 300° C. when the fan 5 having a capability of cooling the lamp 11 down to 300° C. for one minute after the lamp 11 is turned off is used is as shown in the conversion table of FIG. 14.

As in the first preferred embodiment, the controller 23 stores information about the preceding turn-off status of the lamp 11, and immediately turns on the lamp 11 for restart when the preceding turn-off is normal turn-off. When the preceding turn-off is abnormal turn-off, on the other hand, the controller 23 effects variable control of the fan drive time based on the digital data D as described above to cool the lamp 11 down to the restartable temperature T1, and then turns on the lamp 11 for restart.

Alternatively, whenever the controller 23 restarts the lamp 11, the controller 23 effects the variable control of the fan drive time based on the digital data D as described above to cool the lamp 11 down to the restartable temperature T1, and then turns on the lamp 11, as in the third preferred embodiment.

The input to the time management section 27 is not limited to the input E from the second power supply circuit 22b as shown in FIG. 13, but may be any input which satisfies the requirements that no voltage is supplied to the time management section 27 when the projection display apparatus 10c is in the standby state (or the lamp 11 is off) caused by the turn-on of the main switch 21 and that voltage is supplied to the time management section 27 when the lamp controller 24 is in operation caused by the turn-on of the function switch 26a of the manipulation section 26. If the above requirements are satisfied, a line for connection to the input of the time management section 27 may branch off from the line which connects the controller 23 to the lamp controller 24, or other configurations may be used.

As described hereinabove, the projection display apparatus 10c according to the fourth preferred embodiment appropriately determines the fan drive time required to cool the arc tube 14 down to the restartable temperature T1 depending on the elapsed time since the turn-off of the lamp 11. This avoids excessive cooling by the fan 5 for the restart of the lamp 11, to achieve early start of the image projection operation of the projection display apparatus 10c.

Fifth Preferred Embodiment

FIG. 15 schematically shows the construction of a projection display apparatus 10d according to a fifth preferred embodiment of the present invention. In FIG. 15, components designated by the same reference numerals and characters as in FIG. 1 are identical in function with those of the first preferred embodiment. The projection display apparatus 10d differs from the projection display apparatus 10 of the first preferred embodiment in that the signal comparator 28 is removed and that a time management section 27a is substituted for the time management section 27. The time management section 27a has an output connected to the terminal L4 of the controller 23. Other constructions are similar to those described in the first preferred embodiment.

FIG. 16 is a block diagram showing the construction of the time management section 27a. The time management section 27a includes a timer IC 34, and a battery 35 for supplying driving power to the timer IC 34. The driving power supplied from the battery 35 operates the timer IC 34 if the main switch 21 is turned off. The battery 35 includes a single-use battery such as a manganese cell and an alkaline cell, and a rechargeable cell. A capacitor having a capacitance capable of operating the timer IC 34 for a given period of time may be used in place of the battery 35.

Referring to FIG. 15, the terminal L2 of the controller 23 connected to the lamp controller 24 is operatively associated with the terminal L3 of the controller 23 connected through the switching element 222 of the second power supply circuit 22b to the time management section 27a. When the lamp 11 turns off, the input E to the time management section 27a is cut off, and the timer IC 34 shown in FIG. 16 starts a time counting operation. That is, the timer IC 34 is constructed to start the time counting operation at the time that the lamp 11 turns off.

The timer IC 34 outputs a "high" signal until the time tm required to allow the lamp 11 to cool down to the restartable temperature T1 has elapsed since the start of the time counting operation at the time of the turn-off of the lamp 11. After the lapse of the time tm, the timer IC outputs a "low" signal.

The timer IC 34 may be of the type which counts down from the time tm to zero. In this case, the timer IC 34 may be constructed to output a "high" signal while performing a count-down operation after the start of the count-down operation caused by the turn-off of the lamp 11, and to output a "low" signal after the time count reaches zero.

For restart of the lamp 11 after the lamp 11 is turned off, the controller 23 judges that the temperature of the lamp 11 is higher than the restartable temperature T1 when the controller 23 receives the "high" signal from the timer IC 34. On the other hand, the controller 23 judges that the temperature of the lamp 11 is lower than the restartable temperature T1 when the controller 23 receives the "low" signal from the timer IC 34.

As in the first preferred embodiment, the controller 23 stores information about the preceding turn-off status of the lamp 11 in the microcomputer, and immediately turns on the lamp 11 for restart when the preceding turn-off is normal turn-off. When the preceding turn-off is abnormal turn-off, on the other hand, the controller 23 performs the following operation for restart. When the controller 23 receives the "high" signal from the timer IC 34, the controller 23 causes the fan 5 to cool the lamp 11 for a certain period of time, and then turns on the lamp 11. When the controller 23 receives the "low" signal from the timer IC 34, the controller 23 immediately turns on the lamp 11.

Alternatively, the controller 23 may always perform the judging operation as to whether the temperature of the lamp 11 is higher or lower than the restartable temperature T1, based on the signal inputted from the timer IC 34, before the restart of the lamp I1, as in the third preferred embodiment.

Although the "high" signal or the "low" signal is inputted from the time management section 27a to the controller 23 in the above description, the digital data D regarding the elapsed time may be inputted from the time management section 27a to the microcomputer of the controller 23 as in the fourth preferred embodiment. This allows the variable control of the drive time of the fan 5 based on the digital data D to achieve early start of the image projection operation of the projection display apparatus 10d.

Although the signal outputted from the terminal L3 of the controller 23 is inputted through the switching element 222 of the second power supply circuit 22b to the time management section 27a in the above description, this signal may be inputted directly from the terminal L3 to the time management section 27a. Further, the signal outputted from the terminal L2 of the controller 23 may be inputted to the time management section 27a as in the second preferred embodiment.

In the projection display apparatus 10d according to the fifth preferred embodiment as described hereinabove, the timer IC 34 effects the time management. This achieves more precise time management, as compared with the time management section 27 of the first preferred embodiment constituted by the capacitor 32 and the resistor 33. Additionally, the projection display apparatus 10d achieves a simplified circuit configuration because the signal comparator 28 shown in FIG. 1 is dispensed with.

Modifications

Although the preferred embodiments of the present invention are described above, the present invention is not limited to the above description.

For example, although the main switch 21 serves as a switch for turning on and off the external power supply to the projection display apparatus, this switch is not limited to that provided on the main body of the projection display apparatus. Plugging in and removing a power cord of the projection display apparatus may serve as this switch, or a circuit breaker for a house or building may serve as this switch.

The present invention is applicable not only to the projection display apparatus employing a liquid crystal element or a DMD, but also to equipment employing a discharge lamp, such as an OHP (overhead projector), an exposure apparatus and a fiber scope.

While the invention has been described in detail, the foregoing description is in all aspects illustrative and not restrictive. It is understood that numerous other modifications and variations can be devised without departing from the scope of the invention.

What is claimed is:

1. A projection display apparatus configured to modulate light radiated from a lamp to project the modulated light, comprising:
    a cooling element for cooling said lamp;
    a time management section for managing time elapsed since turn-off of power supply to said lamp; and
    a controller for controlling restart of said lamp after turn-off of said lamp, said controller turning on said lamp after causing said cooling element to cool said lamp when the temperature of said lamp is higher than a predetermined temperature, based on an output from said time management section, said controller turning on said lamp without causing said cooling element to cool said lamp prior to turn-on of said lamp when the temperature of said lamp is lower than said predetermined temperature, based on the output from said time management section.

2. The projection display apparatus according to claim 1, wherein
    said controller is configured to store information about whether the preceding turn-off of said lamp is normal or abnormal, and
    for control of the restart of said lamp after the turn-off of said lamp, said controller immediately turns on said lamp when the preceding turn-off of said lamp is normal, and performs a judgment operation as to whether the temperature of said lamp is higher or lower than said predetermined temperature, based on the output from said time management section when the preceding turn-off of said lamp is abnormal.

3. The projection display apparatus according to claim 1, wherein
    said time management section includes a capacitor and a resistor, and is configured to charge said capacitor during a period of time that said lamp is on and to discharge said capacitor through said resistor during a period of time that said lamp is off.

4. The projection display apparatus according to claim 3, wherein setting is made so that the time required for an output voltage from said capacitor to reach a predetermined value by the discharge of said capacitor is equal in length to the time required for the temperature of said lamp allowed to cool down to reach said predetermined temperature.

5. The projection display apparatus according to claim 3, wherein
    said controller is configured to store information about whether the preceding turn-off of said lamp is normal or abnormal, and
    for control of the restart of said lamp after the turn-off of said lamp, said controller immediately turns on said lamp when the preceding turn-off of said lamp is normal, and performs a judgment operation as to whether the temperature of said lamp is higher or lower than said predetermined temperature, based on the output voltage from said capacitor when the preceding turn-off of said lamp is abnormal.

6. The projection display apparatus according to claim 1, wherein
    said controller is configured to store information about whether the preceding turn-off of said lamp is normal or abnormal, and
    for control of the restart of said lamp after the turn-off of said lamp, said controller immediately turns on said lamp when the preceding turn-off of said lamp is normal, and performs a judgment operation as to whether the temperature of said lamp is higher or lower than said predetermined temperature, based on time data outputted from said timer IC when the preceding turn-off of said lamp is abnormal.

7. The projection display apparatus according to claim 1, wherein
    said controller always performs a judgment operation as to whether the temperature of said lamp is higher or lower than said predetermined temperature, based on the output from said time management section, before turning on said lamp.

8. The projection display apparatus according to claim 1, wherein
    said controller changes a period of time that said cooling element cools said lamp, based on the output from said time management section.

9. The projection display apparatus according to claim 5, wherein
    said controller always performs a judgment operation as to whether the temperature of said lamp is higher or lower than said predetermined temperature, based on the output voltage from said capacitor, before turning on said lamp.

10. The projection display apparatus according to claim 5, wherein
    said controller changes a period of time that said cooling element cools said lamp, based on the output voltage from said capacitor.

11. The projection display apparatus according to claim 1, wherein
    said time management section includes a timer IC for counting time, and is configured to start a counting operation of said timer IC at the time that said lamp turns off.

12. The projection display apparatus according to claim 11, wherein
    for control of the restart of said lamp after the turn-off of said lamp, said controller judges that the temperature of said lamp is higher than said predetermined temperature when the time counted by said timer IC is shorter than predetermined time, and judges that the temperature of said lamp is lower than said predetermined temperature when the time counted by said timer IC is longer than said predetermined time.

13. The projection display apparatus according to claim 12, wherein
said predetermined time is set to be equal in length to the time required for the temperature of said lamp allowed to cool down to reach said predetermined temperature.

14. The projection display apparatus according to claim 11, wherein
said controller always performs a judgment operation as to whether the temperature of said lamp is higher or lower than said predetermined temperature, based on time data outputted from said timer IC, before turning on said lamp.

15. The projection display apparatus according to claim 11, wherein
said controller changes a period of time that said cooling element cools said lamp, based on time data outputted from said timer IC.

* * * * *

UNITED STATES PATENT AND TRADEMARK OFFICE
CERTIFICATE OF CORRECTION

PATENT NO. : 7,086,739 B2  Page 1 of 1
APPLICATION NO. : 10/828461
DATED : August 8, 2006
INVENTOR(S) : Hiroshi Kida et al.

It is certified that error appears in the above-identified patent and that said Letters Patent is hereby corrected as shown below:

Claim 6, line 1 col. 18, "claim 1" should read --claim 11--.

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,086,739 B2  Page 1 of 1
APPLICATION NO. : 10/828461
DATED : August 8, 2006
INVENTOR(S) : Hiroshi Kida et al.

It is certified that error appears in the above-identified patent and that said Letters Patent is hereby corrected as shown below:

Claim 6, line 20 col. 18, "claim 1" should read --claim 11--.

This certificate supersedes the Certificate of Correction issued August 5, 2008.

Signed and Sealed this

Twenty-sixth Day of August, 2008

JON W. DUDAS
*Director of the United States Patent and Trademark Office*